United States Patent Office 2,886,389
Patented May 12, 1959

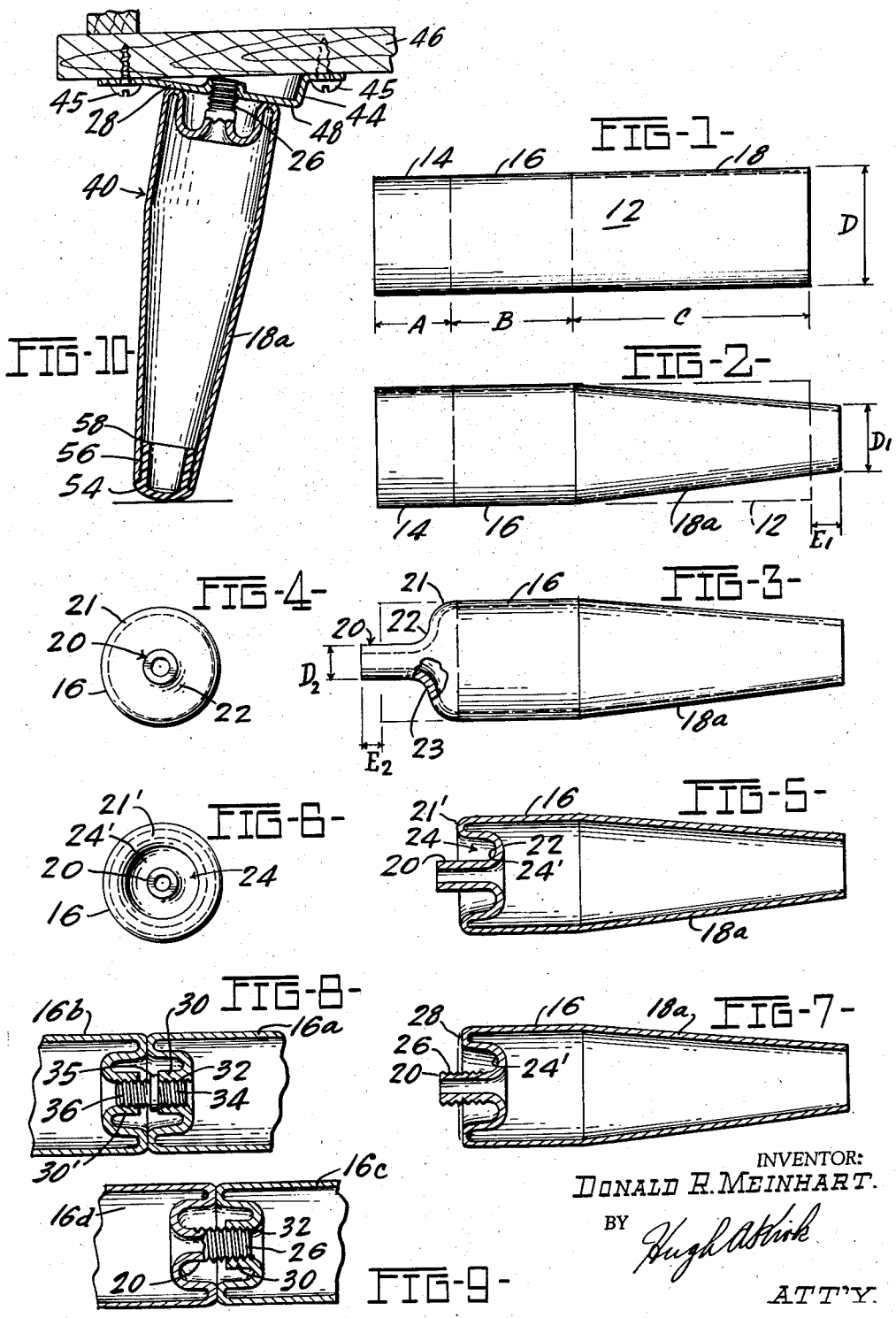

2,886,389

END JOINTS FOR TUBING AND METHOD FOR MAKING THE SAME

Donald R. Meinhart, Temperance, Mich.

Application May 7, 1958, Serial No. 733,720

16 Claims. (Cl. 311—114)

This invention relates to an end joint for tubing and a method for making the same. More particularly, it deals with an end joint construction for articles of tubing which may be formed into legs for furniture such as cabinets, pedestals, chairs and the like. At the present time there is being made a style of furniture having tapered legs of metal and/or other materials, the legs being attached by means of a threaded stud to the bottom surface of such articles in an inclined manner necessitating an attachment plate having an inclined bearing area for attachment of such legs. The joints or fastening devices required for this particular type of attachment have been made in the past of welded or brazed metal inserts or fitments especially formed or fabricated to provide a threaded connection between the related parts. Such stud arrangements, however, require at least two or more parts per joint, thus increasing the manufacturing costs of the articles. It has been a problem in the manufacture of such articles to reduce the cost of such fittings and at the same time to build a strong joint.

It is an object of this invention to produce an efficient, simple, effective, economic, strong, stable and easily manufactured end joint for a tubular article, such as used in the manufacture of furniture legs.

Another object is to provide a one piece manually detachable and concealed end joint on a tube for attachment to a plate or another tube.

It is another object to provide a reinforced unitary structure of superior strength in an end joint for a tube.

A further object is to provide an enlarged land area at the joint contact line of the tube.

Still another object is to provide an improved method for forming such an integral end joint for a tubular article without welding, brazing, soldering, or the like.

In general, the invention comprises a joint for the end of a peice of tubing formed on said tubing and integral therewith comprising: a first flange portion folding and extending inwardly radially from the end of said tubing forming a transverse circumferential outer annular surface or land for the end of said tubing, a second flange portion folding and extending axially inwardly from said first flange portion, a third flange portion folding and extending radially inwardly to form an inner end for said second flange portion, and a fourth flange portion folding and forming a tubular neck portion extending axially outwardly from the inner end of said third flange portion, said fourth flange neck portion being threaded for engagement with a cooperating threaded section on a cabinet, for example, or on another tube for completing said joint.

This invention also comprises a method for forming such a joint at an end of a piece of tubing comprising: reducing the lateral dimensions at said end to form a neck, reintroducing a contiguous portion of said neck in reverse direction into the tube to form a re-entrant S-shaped fold in the wall of the tube to form an annular shoulder portion around the tube, threading at least a portion of said neck and facing the said shoulder portion to form an annular land area substantially transversely of the axis of said tubing at the peripheral end of said tubing.

The above mentioned and other features and objects of this invention and the manner of attaining them will become more apparent and the invention itself will be understood best by reference to the following description of embodiments of the invention taken in conjunction with the accompanying drawings, wherein:

Fig. 1 is a side elevation of a tube or blank from which a tubular article of one embodiment of this invention is manufactured;

Fig. 2 is a side elevation illustrating a step in the manufacture of a taper on the right end of the blank of Fig. 1;

Fig. 3 is a side elevation partly in section showing another step in the formation of an article of this invention, particularly a necking in of the left end of the tube of Figs. 1 or 2;

Fig. 4 is an end elevation of necked end of the form of Fig. 3;

Fig. 5 is a longitudinal section showing a step and method in forming the re-entrant bend of the necked end of the form of Fig. 3;

Fig. 6 illustrates an end elevation of the re-entrant necked end of Fig. 5;

Fig. 7 is a longitudinal section showing an operation for threading the extension of the neck of the re-entrant necked end of the form of Fig. 5;

Fig. 8 is a longitudinal section showing a modified form of a re-entrant necked end joint of this invention having an interiorally threaded neck of the necked end with a stud threaded therein for cooperating with a similar tube end joint shown in dotted lines fitted thereto;

Fig. 9 is a sectional view of a further modified form of joint combining internal and external inter-threaded neck portions of the re-entrant necked ends of the abutting ends of two tubular members; and Fig. 10 is a vertical section of a tapered tubular leg having a necked end joint, similar to that shown in Fig. 7 with its neck threaded into a plate member.

Referring more specifically to Figs. 1 through 7 of the drawings, the manufacture of a joint of the type of this invention, may be started from a tubular blank 12 of a sufficient diameter and length to form the desired joint and article, making provision for growth or retraction of the material in the blank during the steps in the process of its manufacture. For example, in forming a furniture leg and joint as shown in Figs. 7 or 10, a blank 12 may be calculated to be of a certain length to include a zone A or neck portion 14; a zone B to provide a portion 16 of substantially unchanged dimensions, and a zone C to provide a tapered leg portion 18 in the finished article. The original tubing may have a diameter D, which may be reduced during a forming such as swaging or spinning operation to the dimension D1 (Fig. 2) of the small end of the tapered leg portion 18a. While the blank diameter D is being reduced in size to the dimension D1 it is also elongating a substantial distance as shown at E1 in Fig. 2. These changes in dimension may be predetermined by experiment and may vary substantially with different materials used in such construction. The central zone 16 may remain unchanged with its dimensions B and D remaining constant, however, the end portion 14 having a length dimension A may change appreciably during the operation presently to be described.

The joint end zone 14 may be formed by means of a spinning or swaging operation or otherwise reduced to a necked in condition having an outwardly extending neck portion 20 of a diameter D2. This neck portion may increase in wall thickness appreciably and may increase in length a substantial amount E2. This neck portion 20 may begin with a radius 21 formed by a spinning or swaging operation which may progress radially inwardly to a reverse bend portion 22 with consequent elongation into the aforementioned cylindrical neck portion 20 (see Figs. 3 and 4). The wall thickness in the swaged portions 21 to 22 may increase in thickness 23 to act as a reinforcement and stiffening influence in the finishing steps in the article.

In order to provide a strong rigid joint having a shoulder or land area for secure abutment against a mating part, there may be provided a re-entry formation in the tube wherein the neck portion 20 (Figs. 5 and 6) is forced inwardly along the axis of the blank 20 and concentrically with the portion 16 so that the reverse bend portions 22 may be inside the end of the cylindrical wall portion 16 to form a deep re-entrant groove 24 inside the return bend formation of the neck parts. The radius 21 may be reduced considerably to a rather sharp fold portion 21', the outer face of which may be flattened to form an annular land portion, while the radius 22 may become a deep annular groove 24' in the formed contour.

The neck portion 20 may be kept preferably in axial alignment and in concentric formation with the cylindrical portion of the tube and may be threaded as at 26 (see Fig. 7) to form a threaded stem integrally with or on the finished article. This threaded stem is of a heavier wall due to the concentration of materials resulting from the swaging operation, providing a strong rigid element in the joint. The annular land area 28 may be pressed or machined or otherwise finished to give a smooth annular surface at the shoulder 21' as formed on the article; any surface imperfections or blemishes or disfigurement resulting from the swaging or spinning process being smoothed off thereby.

Referring to a modified joint in a tube 16a in Fig. 8, a neck portion 30 of a larger diameter than the neck 20 in Fig. 7, may be finished with internal threads 32 to receive a threaded stud 34, which stud may be brazed or otherwise secured in place in the joint end after being threaded therein to provide a firm permanent connection of these parts. The stud portion 34 may have a flanged annular shoulder portion 35 to provide a collar or stop means for tightly joining the stud 34 in the threaded portion 32 of the neck 30, and also may have an oppositely extending threaded end 36 which may be threaded into a similarly formed internally threaded neck portion 30' on a tube 16b for the purpose of connecting the separate pieces 16a, 16b of tubing to form a concealed joint as shown in section in Fig. 8.

Another embodiment (see Fig. 9) in which a tube 16c is attached to a tube 16d, illustrates the portion 16d as having external threads on the neck portion 20, while the portion 16c has internal threads 32 as on the larger diameter neck portion 30. Thus, a direct interconnection may be made with the complementary end joints of the 16c and 16d tubes having respectively interfitting internally and externally threaded neck portions.

An adaptation of the first described embodiment of this invention shown in Fig. 7 may be in the form of a leg for a cabinet or other article of furniture (Fig. 10) wherein the tubular leg member 40 having a threaded neck portion 26 (similar to Fig. 7) may be threaded into a stamped attachment plate 44, which plate is attached by screws 45 to a bottom or base 46 of the cabinet. The leg 40 may have a land area 28 for contacting a substantially flat but inclined bearing surface 48 on the plate 44, sufficient contact area thus being provided for frictionally holding the leg 40 against any ordinary rotational influence when the cabinet is being moved. The leg 40 may have a plastic foot member or insert 54 frictionally or otherwise attached in the open lower end 56 of smaller diameter D1 of the leg 40, and/or may have internal threads therein for receiving a threaded portion 58 on the insert 54 in addition to cement or other adhesive means.

The joint member in general may be formed of steel or aluminum tubing, or other metallic material of sufficient malleability to receive the swaging and deforming operations employed in the process of this invention, however, annealing operations between the forming or formative steps may be used. The article may be anodized, plated, enameled or otherwise treated in a decorative manner as may be desired for any specific use.

While there is described above the principles of this invention in connection with specific apparatus, it is to be clearly understood that this description is made only by way of example and not as a limitation to the scope of this invention.

What is claimed is:

1. A joint for the end of a piece of tubing comprising: a tenon axially of said tube, a re-entry web portion conjoining said tenon and said tube, said tenon and said web being formed integrally from the wall of said tube.

2. A joint according to claim 1 in which the said tenon has screw threads formed thereon.

3. A joint according to claim 2 in which the screw threads are formed on the outer wall of the tenon.

4. A joint according to claim 1 in which the said tenon is tubular.

5. A joint according to claim 4 in which the screw threads are formed on the inner wall of the tenon.

6. A joint according to claim 1 in which said web comprises a transverse annular land portion at the junction of said web with the sides of said tube.

7. A joint according to claim 1 in which said re-entrant web comprises an S-shaped cross-section extending from said tenon radially outwardly conjoining the side walls of the tube.

8. A joint according to claim 1 in which said re-entrant web comprises a circumferential radially inwardly folded flange portion to form a peripheral transverse land area adjacent the side wall of the tube, said inwardly folded flange portion being trans-shaped to form a central hub portion within the tube and having a central neck portion extending axially outwardly of the tube from said hub portion to form said tenon.

9. A joint for the end of a piece of tubing and integral therewith comprising: a first flange portion extending inwardly radially from the end of said tubing forming a flattened outer annular surface for the end of said tubing, a second flange portion extending inwardly axially from said first flange portion, a third flange portion extending radially inwardly, and a fourth flange portion forming a tubular neck portion extending axially outwardly from the inner end of said third flange portion, said fourth flange neck portion being threaded for engagement with a cooperating threaded section for completing said joint.

10. A table leg comprising a metal tubular leg element, a joint for the leg comprising: a tenon extending axially from one end of said tube, an annular re-entrant web portion conjoining said tenon and said tube, said tenon and said web being formed integrally from the wall of the tube, threads on said tenon, and a cooperating threaded element on the table adapted to receive the threaded tenon on the leg.

11. A threaded joint for the end of a tube comprising: a peripheral transverse land portion at the end of said tube formed integral with the side wall of the tube, a tenon formed integrally with said land portion and side wall of the tube, threads inside said tenon, and a stud having one end thereof threaded into said tenon.

12. A threaded joint for end-to-end coupling of a pair of tube elements comprising: a tenon on one tube formed integrally with the side wall of the tube, threads inside the tenon, a stud having one end thereof threaded into said tenon, a second tube having a tenon similar to the first mentioned tube having internal threads for attachment to the other end of said stud.

13. A joint for end-to-end coupling of a pair of tubes comprising: a tenon formed integrally on one of the tubes, internal threads in the tenon, and a second tube having an integrally formed tenon, threads being formed on an outer surface of said tenon adapted to be threaded into the internal threads of the first named tenon on the first named tube.

14. A method for forming a joint at an end of a piece of tubing comprising: reducing said end into a neck, and trans-shaping said neck so that at least a part of said neck is re-entered within the end of said tube and a peripheral transverse land portion is formed at the tube around said neck.

15. A method according to claim 14 including threading said neck.

16. A method of forming a joint at an end of a piece of tubing comprising: reducing the lateral dimensions at said end to form a neck, re-introducing a contiguous portion of said neck in a reverse direction into the tubing to form a re-entrant bend in the wall of the tube to form an annular shoulder portion at the periphery of the tubing, threading at least a portion of said neck, and facing the said shoulder portion to form an annular land area substantially transversely of the axis of said tubing.

References Cited in the file of this patent

UNITED STATES PATENTS

| | | |
|---|---|---|
| 590,749 | Zea | Sept. 28, 1897 |
| 2,581,312 | Tinnerman | Jan. 1, 1952 |
| 2,738,246 | Hogan | Mar. 13, 1956 |
| 2,809,876 | Huff | Oct. 15, 1957 |
| 2,827,925 | Meibaum | Mar. 25, 1958 |
| 2,836,215 | Rapata | May 27, 1958 |